United States Patent [19]

Gerteis

[11] 4,269,711

[45] May 26, 1981

[54] FILTER CENTRIFUGE

[75] Inventor: Hans Gerteis, Bietigheim-Bissingen, Fed. Rep. of Germany

[73] Assignee: Firma Heinkel Industriezentrifugen GmbH & Co., Fed. Rep. of Germany

[21] Appl. No.: 883,750

[22] Filed: Mar. 6, 1978

[30] Foreign Application Priority Data

Mar. 8, 1977 [DE] Fed. Rep. of Germany ....... 2709894

[51] Int. Cl.[3] .............................................. B01D 33/10

[52] U.S. Cl. .................................... 210/232; 210/370; 210/380.3; 233/2; 233/14 R

[58] Field of Search ........... 210/360 R, 380 R, 380 L, 210/380 H, 396, 232, 270; 233/2, 14 R

[56] References Cited

U.S. PATENT DOCUMENTS

| | | | |
|---|---|---|---|
| 3,263,815 | 8/1966 | Golücke et al. | 210/380 H |
| 3,347,380 | 10/1967 | Alsobrooks | 210/380 H |
| 4,193,874 | 3/1980 | Gerteis | 210/232 |

*Primary Examiner*—William F. Smith
*Assistant Examiner*—Ferris H. Lander
*Attorney, Agent, or Firm*—Kenway & Jenney

[57] ABSTRACT

A filter centrifuge having a perforated drum in which a filter cloth is disposed with one end firmly attached to the drum and the other end attached to a base plate coaxial and rotatable with the drum, the drum being fastened to a hollow shaft, the interior of the hollow shaft serving as a receiver for another shaft carrying said base plate, the remote end of the shaft forming a piston rod displaceable axially to invert said filter cloth.

9 Claims, 6 Drawing Figures

Figure 1:
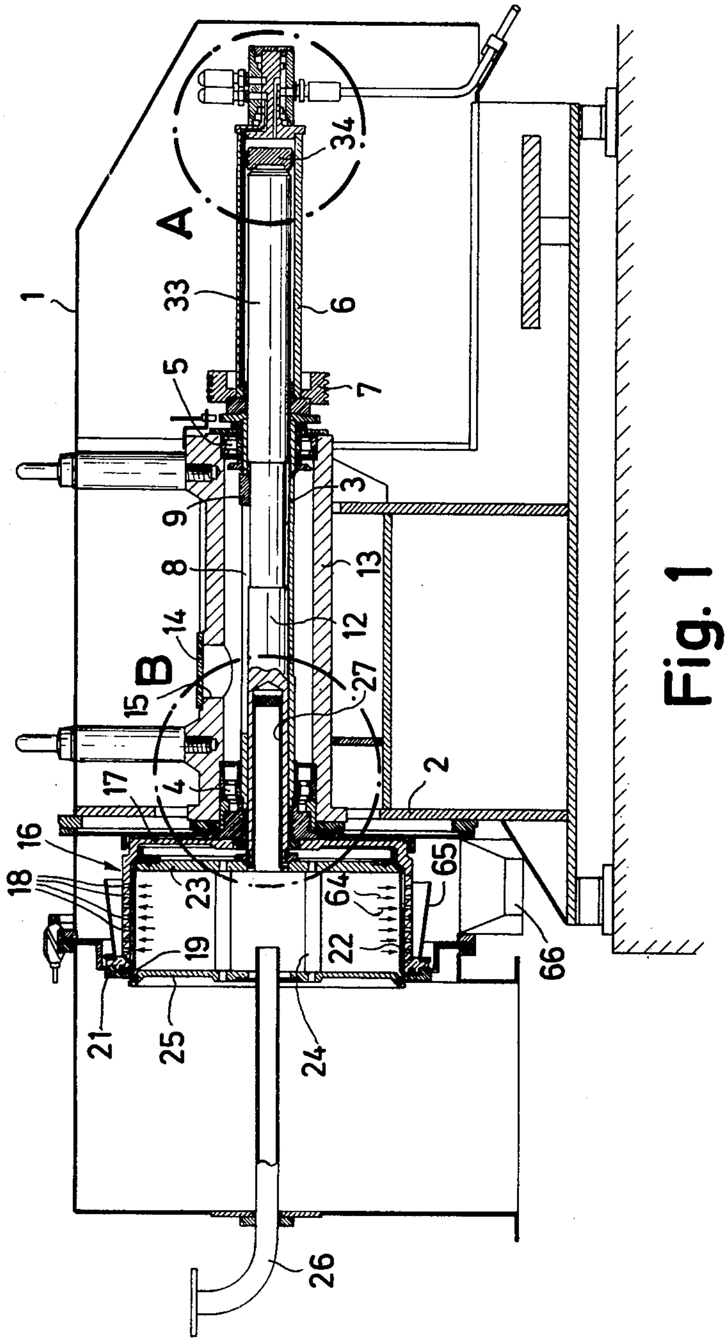

Fig. 3
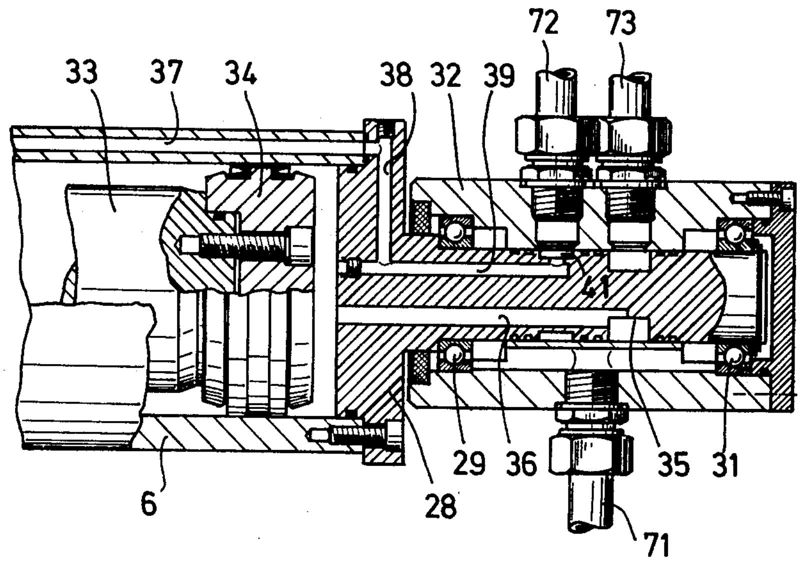
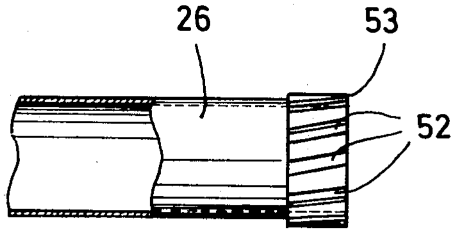
Fig. 5
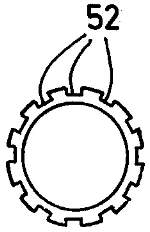
Fig. 6

FILTER CENTRIFUGE

The invention concerns a filter centrifuge for the separation of solid and liquid components in a suspension, with a centrifugal drum with a radial port-hole, positioned rotatably in a centrifuge housing, open on one face, and with a filter cloth which can be inserted in the drum, which is removably fastened on one side to the periphery of the aperture of the drum which is tightly sealable by a centrifuge bowl cover, and on the other side to a base plate rigidly bonded to the cover so as to leave a space between them, wherein the centrifugal drum and the base plate are oriented coaxially to one another, can rotate together, and are movable axially with respect to one another, and with a feed-pipe extending into the centrifuge bowl for feeding the suspension.

In known filter centrifuges of this type (DT-PS No. 1 911 147), the base plate is held axially immobile, while the centrifuge drum can be pushed axially above the base plate. This represents an expensive method of construction, whose performance is limited. In particular, difficult sealing and storage problems occur in this case, which lead to a large amount of wear, and make frequent repairs necessary. This is particularly true with respect to the hydraulic operating cylinder generally used for the relative axial motion between drum and base plate. Also, these known filter centrifuges require a comparatively high, undesired floor space.

It is the object of the invention to simplify the expensive construction of the known filter centrifuges with simultaneous increase of the performance, and thereby to perfect more compact centrifuges less subject to wear and more convenient to service.

The object is solved according to the invention, by the fact that the centrifuge drum is fastened on a hollow shaft which can be rotated in the centrifuge housing and which is immovable axially, and the interior of the hollow shaft serves as the receiver for a shaft carrying the base plate, rotating with the hollow shaft, but displaceable axially with respect to it.

It is particularly advantageous therein, if the free end of the displaceable shaft away from the base plate acts as a piston rod portion of a pressure cylinder for the axial motion of the base plate which brings about the protrusion of the filter cloth to discharge the solids, wherein it is favorable furthermore, to form the pressure cylinder as an element which rotates with the centrifugal drum, since thereby on the one hand, a space-saving construction method is made possible, and on the other hand, the bearings are kept free of axial forces, since these are guided exclusively directly to the displaceable shaft in the proposed solution. By means of the proposed combination, to form the displaceable shaft as a piston rod and to flange the pressure cylinder to rotate along with the hollow shaft, the advantage of a satisfactory rotation of the centrifuge is finally obtained.

Figure 2:
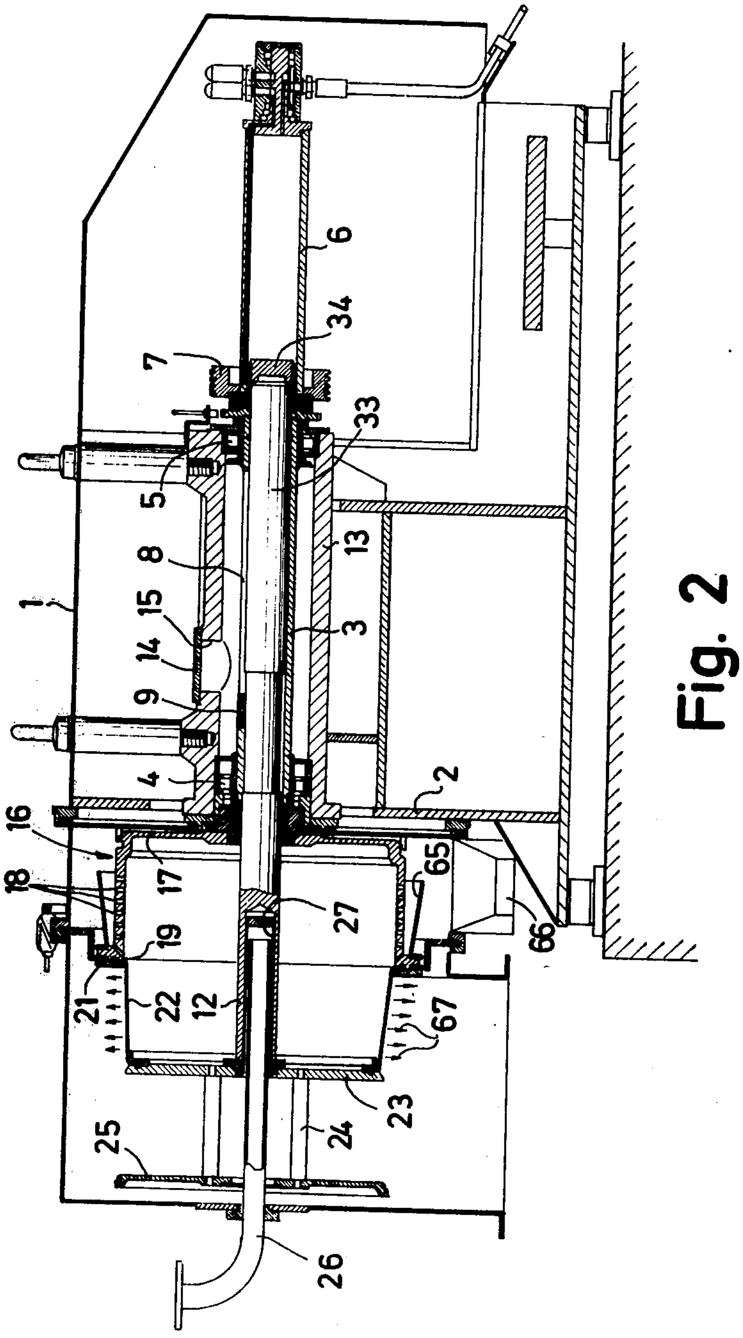
Figure 4:
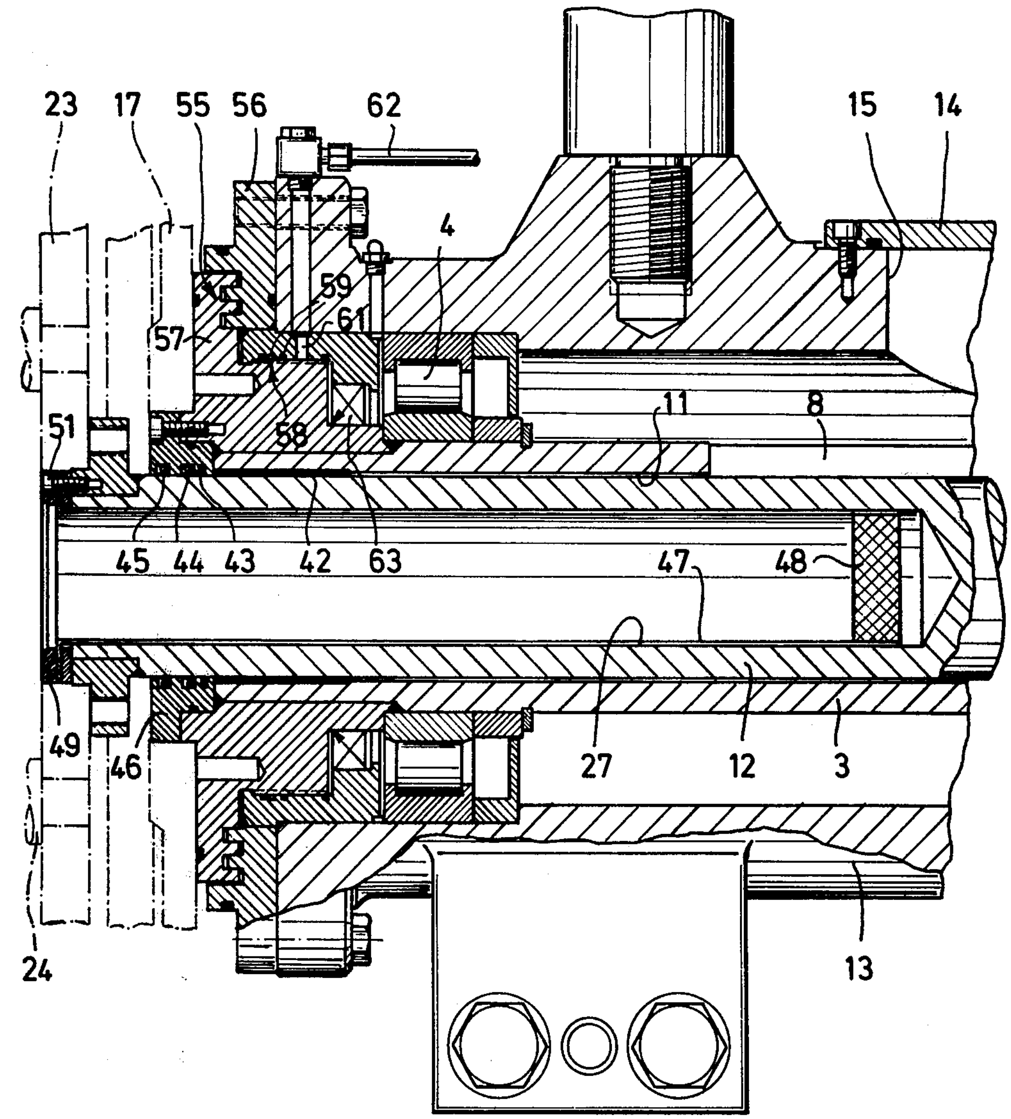

The following description of preferred embodiments of the invention serves as further explanation in connection with attached drawings. Shown are:

FIG. 1, a schematic sectional view of a filter centrifuge during the operational phase of a centrifuging;

FIG. 2, schematically, the centrifuge from FIG. 1 in the process of discharging the solids;

FIG. 3, an enlarged detail view in the area of the dotted circle A in FIG. 1;

FIG. 4, an enlarged detail view in the area of the circle B in FIG. 1;

FIG. 5, a detail view of the front end of a filling tube, and

FIG. 6, a frontal view of the filling tube of FIG. 5.

The filter centrifuge illustrated in FIGS. 1 and 2 includes a simply schematically indicated centrifuge housing 1, tightly enclosing the entire machine, in which a hollow shaft 3 is rotatably positioned in roller bearings 4, 5, on a stationary machine frame 2. A pressure cylinder 6, preferably a hydraulic cylinder, is attached by sealed flange to the end of the hollow shaft 3 located on the right of FIGS. 1 and 2, extending through the bearing 5. A drive wheel 7 is connected to this cylinder 6 so as to rotate with it, by which the hollow shaft 3 and the cylinder 6 can be set into ragid rotation together in a known way, for example, by means of a v-belt drive from an electric motor. The hollow shaft 3 passing rigidly between the bearings 4, 5, has a groove 8 directed axially, visible in FIGS. 1 and 2, in which a key 9 can be shifted. This key 9 is connected rigidly with a shaft 12 displaceable in the interior 11 of the hollow shaft 3 (cf. FIG. 3) formed as a drill hole. The shaft 12, therefore, rotates in common with the hollow shaft 3, but is displaceable axially within it. The shafts 3 and 12 run in a sleeve-shaped housing 13 which also serves as the retainer for the bearings 4, 5, which is supported on the machine frame 2, and whose interior is accessible through an opening sealed tightly by a removable cover 14.

A cup-shaped centrifugal drum 16 with its base 17 is attached by flange, rotationally fixed, to the end of the hollow shaft 3 extending through the bearing 4. The drum 16 has radially penetrating openings 18 on its cylindrical side wall. The drum 16 is open at its front face opposite the base 17. To the rim of the opening surrounding this open front face 19—cf. FIG. 2—is tightly stretched one edge of an essentially cylindrically shaped filter cloth by means of a ring flange 21. The other edge of the filter cloth 22 is tightly connected in a corresponding manner with a base plate 23, which is connected rigidly with the displaceable shaft 12. A centrifuge bowl cover 25 is rigidly fastened to the base plate 23 by retaining bolts 24, leaving a free space. The centrifuge bowl cover tightly seals the centrifuge bowl of the drum 16 in FIG. 1, by resting on its rim, and is raised in FIG. 2, along with the base plate 23 by axial expulsion of the shaft 12 from the hollow shaft 3 from the drum 16. A filling tube 26 is rigidly arranged on the front side of the filter centrifuge shown on the left in FIGS. 1 and 2, which serves for introduction of the suspension to be separated into its solid and liquid components, into the centrifuge bowl (FIG. 1) and penetrates into a bore hole 27 of the displaceable shaft 12 in the operating condition of the centrifuge shown in FIG. 2. As can be seen in FIG. 3, a machine part 32 is located rotatively on a sealing plug 28 by means of bearings 29, 31, which plug is connected firmly with the pressure cylinder 6 and rotates together with it. The machine part 32 is prevented from rotating, for example, by fixed leads 61, 62, 63, and therefore, remains at rest when the sealing plug 28 is rotating. The leads 71, 72, 73, the machine part 32 and the sealing plug 28, bring about the inflow and outflow of the pressure means, preferably a hydraulic fluid, for the back and forth motion of the displaceable shaft 12, whose rear part 33 penetrates into the pressure cylinder 6 as a piston rod, and is bolted in that position with a double-acting piston 34. In a known fashion, which is therefore not described further in detail, feed lines and remote control valves are connected with the feed lines 71, 72, 73, which conduct the pressure agent directly through an annular channel 35 and the bore hole 36 to the one side of the piston 34, so that the piston, through the piston shaft 33 and the displaceable shaft 12, moves the base plate 23 into the position shown in FIG. 2. The pressure medium located on the other side of the piston 34 flows through a channel 37 formed in the wall of the cylinder 6, holes 38, 39, and an annular channel 41. With appropriate reversal of the valves, pressure medium under pressure flows through the channel 37 to the other side of the piston 34 and presses the piston into the position shown in FIG. 3, whereby the operating configuration of the centrifuge shown in FIG. 1 is obtained. In this case, the pressure medium flows away freely from the side of the piston shown on the right in FIG. 3, through the hole 36 and the annular channel 35 as well as through the lines and valves connected with these.

As can be seen in FIG. 4, a slider 42, partially lining the hollow shaft 3 in the form of a ring-shaped plastic band, is provided as a bearing surface for the displaceable shaft 12. In the direction of the centrifuge bowl, a grease-containing annular chamber 43 and two bearing seals 44, 45, are fitted to this sliding element 42, which are arranged in the part 46 of the hollow shaft 3 which carries the base 17 of the centrifuge drum 16. The grease contained in the chamber 43 serves as an additional seal, and at the same time as lubrication for the displaceable shaft 12, to protect this against wetting by the filtrate. As is also seen in FIG. 4 the central hole 27 of the displaceable shaft 12, which accepts the filling pipe 26 in the operating condition shown in FIG. 2, is covered with a replaceable cleaning insert 47. This cleaning insert 47 is formed as a teflon pipe, which is sealed at the end by a disk shaped base 48. It has been found that practically no solid is deposited on such a pipe. The pipe shaped cleaning insert 47 is held temporarily at its open end by a circular flange 49 and bolts 51. Thereby, from time to time, the product entering the central hole of the displaceable shaft 12 from the centrifuge bowl in the centrifuge process, and deposited there, can be easily removed.

In order to be able to extend the time interval between these cleaning procedures to be relatively long, it is advantageous to provide the filling pipe 26 with milled grooves 52 (FIGS. 5 and 6) at its forward edge which enters the central hole 27 of the shaft 12, for the scraping of product residues when it travels into the concentral hole 27 or the insert 47 of the rotating shaft 17. The milled grooves 52 running diagonally to the axis of the filling pipe, act like the grooves of a worm screw, so that the scraped off product residues reach the forward edge 53 of the filling pipe 26, formed somewhat larger in diameter than the rest of the filling pipe, and are carried along upon the withdrawal of the filling pipe from the hole 27 or the insert 47.

In order to obtain a particularly trustworthy sealing of the bearing positions 4, 5 of the centrifuge drum which is self-supporting or overhung with respect to the filtrate area, various sealing precautions are taken. These precautions prevent the liquid filtrate which is centrifuged off and is partially atomized from entering the highly sensitive and highly loaded bearings 4, 5, and making these unusable. This result is obtained by sealing these bearings against the filtrate area by a system of slot, labyrinth, bolt, compressed air, and/or sliding seals. In this respect, the series of successive seals—viewed from the centrifuge drum outwards—corresponding to the information presented, has been shown to be particularly effective. The seal precautions mentioned are apparent in FIGS. 1, 2, and 4. As is seen from FIGS. 1 and 2, the cylindrical wall of the centrifuge drum 16 in the area of the base 17 is convered by a fixed traditional groove seal 54 in the form of a separating flange. A slide seal can also be installed in this flange. Large solid particles are held back by this. As seen in FIG. 4, in the vicinity of the center of the base 17 of the centrifuge drum 16 is provided a traditional labyrinth seal 55, which is formed between a fixed part 56 and a co-rotating part 57. Ending at this labyrinth seal is a screw seal 58, is recognized form, whose groove 59 provided on a fixed component are provided in such a direction of winding that upon rotation of the part 57, any foreign material which penetrates is transported back as if by a worm screw in the direction of the labyrinth seal 55. A compressed air seal 61 terminates at the screw seal 58. This seal consists essentially of a fixed annular groove which is connected with a compressed air lead 62. The compressed air introduced into the groove prevents contamination penetrating in the direction towards the bearing 4. Finally, an ordinary shaft ring seal 63 is placed directly in front of the bearing 4 as a contact seal.

In operation, the filter centrifuge first assumes the condition shown in FIG. 1. The displaceable shaft 12 is drawn back into the hollow shaft 3 and in the pressure medium cylinder 6, whereby the base plate 23 connected with the shaft 12 lies in the vicinity of the base 17 of the centrifuge drum 16, and the filter cloth 22 is inverted in the drum in such a way that it lies on the inside of the cylindrical wall of the drum. The centrifuge bowl cover 25 in this case has been placed down tightly on the opening edge of the centrifuge drum 16. While the centrifuge drum is rotating, suspension to be filtered is introduced through the filling pipe 26. The liquid components of the suspension pass through the openings 18 of the centrifuge drum in the direction of the arrows 64, and are guided into a discharge line through a screen 65. The solid particles of the suspension are held back by the filter cloth 22. As the centrifuge drum continues to rotate, the shaft 12 is now displaced as in FIG. 2 (towards the left), whereby the filter cloth 22 is turned inside out towards the outside, and the solid particles clinging to it are centrifuged off in the direction of the arrows 67 into the centrifuge housing 2. They are easily conveyed away from there. In the condition according to FIG. 2, the filling pipe 26 penetrates into the hole 27 of the shaft 12 through holes which are provided in the cover 25 and in the base plate 23. When the centrifuging off of the soild particles has been completed, the filter centrifuge is again brought into operating condition as shown in FIG. 1, by a return motion of the piston.

The filter centrifuge described has the advantage that it makes possible a very compact structure which is therefore, efficient, reliable in operation, and requires little maintenance, by relatively simple means.

I claim:

1. Filter centrifuge for the separation of solid and liquid components found in a suspension, with a centrifugal drum having radial discharge openings, which is positioned rotatably in a centrifuge housing, and is open at one front side, and with a filter cloth which can be installed in the drum, which is fastened removably on the one side to the opening edge of the drum which can be tightly sealed by a centrigue bowl cover, and on the other side with the base plate rigidly connected with the cover so as to leave a space between, wherein the centrifugal drum and the base plate are coaxial with one another, can be displaced in rotation together, and are movable axially with respect to one another, and with a filling pipe extending centrally into the centrifuge bowl for introduction of the suspension, characterized in that the centrifugal drum (16) is fastened to a hollow shaft (3) positioned rotatably in a centrifuge housing (2) and which is not displaceable axially, and the interior (11) of the hollow shaft (3) serves as a receiver for a shaft (12) having a free end remote from said base plate (23) forming a piston rod (33) disposed for axial movement in a pressure medium cylinder (6), whereby axial movement of said base plate (23) causes inversion of said filter cloth (22) to discharge said solids.

2. Filter centrifuge according to claim 1, characterized in that the centrifugal drum (16) is self-supporting at the side opposite to its open front side.

3. Filter centrifuge according to claim 1 characterized in that the sliding elements (42) are provided as bearing surfaces for the displaceable shaft (2) in the interior (11) of the hollow shaft (3) formed as a cylindrical bore, before which is positioned against the centrifugal drum, first a grease-containing chamber (43) and thereafter at least one sliding seal (44, 45).

4. Filter centrifuge according to claim 1 characterized in that the pressure medium cylinder (6) acting together with the displaceable shaft (12) serving as a piston rod (33), is formed as a rotating element.

5. Filter centrifuge according to claim 1, characterized in that the displaceable shaft (12) is provided with a central bore hole (27) to accept the filling pipe (26) when discharging the solid.

6. Filter centrifuge according to claim 5, characterized in that the central hole (27) of the displaceable shaft (12) is covered with a replaceable cleaning insert (47).

7. Filter centrifuge according to claim 6, characterized in that the filling pipe (26) is provided with milled grooves (52) at its forward edge (53) for scraping off of the solid residues upon introduction into the central hole (27) of the rotating shaft (12).

8. Filter centrifuge according to claim 1, characterized in that the bearing positions of the hollow shaft (3) are sealed off from the centrifugal drum (16) by a system of gap (54), labyrinth (55), screw (58), compressed air (61), and/or contact seals (63).

9. Filter centrifuge according to claim 8, characterized in that the successive series of seals recited therein and arranged sequentially from the centrifugal drum (16) outwards.

* * * * *